(12) United States Patent
Cao et al.

(10) Patent No.: US 12,738,031 B2
(45) Date of Patent: Sep. 15, 2026

(54) IMAGE PROCESSING SYSTEMS AND METHODS AND ASSOCIATED AUTOMATIC CONTROLS

(71) Applicant: Amadeus S.A.S., Biot (FR)

(72) Inventors: Hongliu Cao, Nice (FR); Eoin Thomas, Antibes (FR); Alexis Ravanel, Noumea (FR)

(73) Assignee: AMADEUS S.A.S., Biot (FR)

( * ) Notice: Subject to any disclaimer, the term of this patent is extended or adjusted under 35 U.S.C. 154(b) by 239 days.

(21) Appl. No.: 18/428,165

(22) Filed: Jan. 31, 2024

(65) Prior Publication Data

US 2024/0265677 A1 Aug. 8, 2024

(30) Foreign Application Priority Data

Jan. 31, 2023 (EP) .................................... 23315017

(51) Int. Cl.

| | |
|---|---|
| ***G06V 10/774*** | (2022.01) |
| ***G06T 11/00*** | (2006.01) |
| ***G06V 10/75*** | (2022.01) |
| ***G06V 10/776*** | (2022.01) |
| ***G06V 10/82*** | (2022.01) |
| ***G06V 40/16*** | (2022.01) |
| ***G06V 40/70*** | (2022.01) |
| ***G07C 9/10*** | (2020.01) |
| ***G07C 9/25*** | (2020.01) |

(52) U.S. Cl.

CPC ............ *G06V 10/774* (2022.01); *G06T 11/00* (2013.01); *G06V 10/75* (2022.01); *G06V 10/776* (2022.01); *G06V 10/82* (2022.01); *G06V 40/172* (2022.01); *G06V 40/70* (2022.01); *G07C 9/10* (2020.01); *G07C 9/257* (2020.01)

(58) Field of Classification Search

CPC .... G06V 10/774; G06V 10/75; G06V 10/776; G06V 10/82; G06V 40/172; G06V 40/70; G06V 40/161; G06T 11/00; G07C 9/10; G07C 9/257; G06F 18/214; G06F 18/28

See application file for complete search history.

(56) References Cited

U.S. PATENT DOCUMENTS

| | | | | |
|---|---|---|---|---|
| 2020/0175290 | A1* | 6/2020 | Raja | G06F 21/32 |
| 2021/0150187 | A1 | 5/2021 | Karras et al. | |
| 2022/0028139 | A1 | 1/2022 | Mitra et al. | |
| 2022/0084204 | A1* | 3/2022 | Li | G06N 3/08 |

(Continued)

FOREIGN PATENT DOCUMENTS

| | | | |
|---|---|---|---|
| CN | 111652827 | A | 9/2020 |
| EP | 4246459 | A1 | 9/2023 |

OTHER PUBLICATIONS

Cole et al, Synthesizing Normalized Faces from Facial Identity Features, 2017, IEEE Conference on Computer Vision and Pattern Recognition, pp. 1-11. (Year: 2017).*

(Continued)

*Primary Examiner* — Kathleen M Broughton

(74) *Attorney, Agent, or Firm* — PERRY + CURRIER INC.

(57) ABSTRACT

The present specification provides a system and method to process images including biometric data. The method includes use of synthetic images, without use of personal identifiable information (PII). The synthetic images can be used for different applications such as to provide a machine learning dataset that can be used to control output devices.

10 Claims, 9 Drawing Sheets

(56) References Cited

U.S. PATENT DOCUMENTS

| | | | | |
|---|---|---|---|---|
| 2022/0222892 A1* | 7/2022 | Luo | ........................ | G06T 15/506 |
| 2025/0131769 A1* | 4/2025 | Thomas | ............... | G06V 40/168 |

OTHER PUBLICATIONS

Shen et al, InterFaceGAN: Interpreting the Disentangled Face Representation Learned by GANs, 2020, arXiv: 2005.09635v2, pp. 1-16. (Year: 2020).*
Liu et al, Normalized face image generation with perceptron generative adversarial networks, 2018, IEEE 4th International Conference on Identity, Security, and Behavior Analysis, pp. 1-9. (Year: 2018).*
Zhang et al, A Novel Counterfeit Feature Extraction Technique for Exposing Face-Swap Images Based on Deep Learning and Error Level Analysis, 2020, Entropy, 2020, 22, 249; pp. 1-17. (Year: 2020).*
Ankile et al, Application of Facial Recognition using CNNs for Entry Access Control, 2020, arXiv: 2011/11257v1, pp. 1-20. (Year: 2020).*
Deng, Yu, et al. “Disentangled and controllable face image generation via 3d imitative-contrastive learning.” Proceedings of the IEEE/CVF conference on computer vision and pattern recognition. 2020.
Karras, Tero et al. “A style-based generator architecture for generative adversarial networks.” Proceedings of the IEEE/CVF conference on computer vision and pattern recognition. 2019.
Wu, Zongze et al. “Stylespace analysis: Disentangled controls for stylegan image generation.” Proceedings of the IEEE/CVF Conference on Computer Vision and Pattern Recognition. 2021.
Ramamoorthi, Ravi et al. “An efficient representation for irradiance environment maps.” Proceedings of the 28th annual conference on Computer graphics and interactive techniques. 2001.
Zhang, Meng et al. “Hair-gans: Recovering 3d hair structure from a single image.” arXiv preprint arXiv:1811.06229 (2018).
He, Kaiming, et al. “Deep residual learning for image recognition.” Proceedings of the IEEE conference on computer vision and pattern recognition. 2016.
Goodfellow, Ian, et al. “Generative adversarial networks.” Communications of the ACM 63.11 (2020): 139-144.
Zhou, Hang, et al. “Rotate-and-render: Unsupervised photorealistic face rotation from single-view images.” Proceedings of the IEEE/CVF conference on computer vision and pattern recognition. 2020.
Liu, Yang, et al. “Relighting images in the wild with a self-supervised siamese auto-encoder.” Proceedings of the IEEE/CVF Winter Conference on Applications of Computer Vision. 2021.
Shen, Yujun, et al. “Interfacegan: Interpreting the disentangled face representation learned by gans.” IEEE transactions on pattern analysis and machine intelligence (2020).
Abdal, Rameen, et al. “Styleflow: Attribute-conditioned exploration of stylegan-generated images using conditional continuous normalizing flows.” ACM Transactions on Graphics (ToG) 40.3 (2021): 1-21.
Kowalski, Marek, et al. “CONFIG: Controllable Neural Face Image Generation.” Computer Vision—ECCV 2020: 16th European Conference, Glasgow, UK, Aug. 23-28, 2020, Proceedings, Part XI. 2020.
Hu, Yibo, et al. “Pose-guided photorealistic face rotation.” Proceedings of the IEEE conference on computer vision and pattern recognition. 2018.
Liu, Xiaofeng, et al. “Normalized face image generation with perceptron generative adversarial networks.” 2018 IEEE 4th International Conference on Identity, Security, and Behavior Analysis (ISBA). IEEE, 2018.
Venkatesh, Sushma, et al. “Face morphing attack generation and detection: A comprehensive survey.” IEEE transactions on technology and society 2.3 (2021): 128-145.
Wang, Xiang et al. “A survey on face data augmentation.” arXiv preprint arXiv:1904.11685. Apr. 26, 2019.
Paysan, Pascal, et al. “A 3D face model for pose and illumination invariant face recognition.” 2009 sixth IEEE international conference on advanced video and signal based surveillance. Ieee, 2009.
Tewari, Ayush, et al. “Stylerig: Rigging stylegan for 3d control over portrait images.” Proceedings of the IEEE/CVF conference on computer vision and pattern recognition. 2020.
U.S. Appl. No. 18/846,052, Generating Training and/or Testing Data of a Face Recognition System for Improved Reliability, filed Sep. 11, 2024.

* cited by examiner

IMAGE PROCESSING SYSTEMS AND METHODS AND ASSOCIATED AUTOMATIC CONTROLS

CROSS-REFERENCE TO RELATED APPLICATION(S)

This application claims the benefit of European Patent Application No. 23315017.6, filed Jan. 31, 2023, entitled "FACIAL RECOGNITION SYSTEMS AND METHODS AND ASSOCIATED AUTOMATED CONTROLS"; the entire contents of which are incorporated herein by reference.

FIELD

The present disclosure generally relates to image processing associated with processing of biometric data such as facial recognition and associated automated controls.

BACKGROUND

Processing biometric data, such as facial recognition, requires significant computational resources. Faces are complex, varying in shape, size, color, and texture, and they can change over time or be partially obscured or altered by facial expressions, accessories, or lighting conditions.

SUMMARY

In this context, methods, systems and computer program products are presented as defined by the independent claims.

As a first aspect, the present disclosure provides a method for controlling an output device based on a normalized image of a face generated from a captured non-normalized image of the face comprising generating a random dataset of images representing synthetic non-normalized photographs of human faces and backgrounds and generating an output dataset of synthetic normalized photographs, which is achieved by, for each synthetic non-normalized photograph, removing variations to generate a normalized image of each human face and removing the backgrounds surrounding each human face for each normalized image. The method further comprises generating a training dataset including the random dataset and the output dataset, training a neural network to generate normalized photographs from non-normalized photographs using the training dataset, receiving a non-normalized facial image of an individual, applying the neural network to generate a normalized facial image from the non-normalized facial image, and controlling an output device based on the normalized image of the individual.

In some embodiments, the method further comprises capturing a passport image of the individual, performing a comparison of the normalized image with the passport image, and, wherein the controlling comprises selectively controlling a gate to permit or deny passage of the individual through the gate according to the comparison.

The synthetic non-normalized photographs can be generated from random noise and a pre-trained generative adversarial network (GAN) to thereby control the output device using a neural network without relying upon personal identifiable information (PII) in a training dataset.

The controlling can comprise controlling a display device to generate the normalized facial image beside the non-normalized facial image of the individual.

The removal of variations can include at least one of: normalizing frontal facial illumination; generating a neutral pose; generating a neutral expression; removal of glasses; and creating a uniform light color background.

The random dataset can be generated according to a generative adversarial network (GAN) and the applying comprises inverting the non-normalized facial image into the GAN space used for the random dataset.

Another aspect of the specification provides a checkpoint apparatus comprising a camera for receiving a non-normalized first image of a face an individual and a scanner or other input apparatus for receiving an identification document photograph of a second image of a face. The apparatus also includes a connection to a processor configured to generate a normalized image from the first image by removing a background and orienting the face of the first image directly towards a virtual camera. The normalized image is created from a neural network dataset that excludes the individual. The processor is configured to perform a determination whether the first image and the second image are of the same individual. The checkpoint apparatus also includes an output device connected to the processor for selectively performing a function based upon the determination.

The function can be one of opening a gate, activating a luggage conveyor belt, printing a boarding pass, or printing a luggage tag if the first image and the second image are of the same individual.

Further refinements are set forth by the dependent claims.

These and other objects, embodiments and advantages will become readily apparent to those skilled in the art from the following detailed description of the embodiments having reference to the attached figures, the disclosure not being limited to any particular embodiments.

DETAILED DESCRIPTION

Identification documents ("ID") such as passports and driver's licenses serve the dual function of identifying an individual and the privileges granted to the individual. Presentation of the ID can be required in various circumstances to confirm access to the granted privileges. Unique identifying characteristics or other indicia of the individual can be associated with the ID including height, date of birth, eye colour, gender, place of birth and the like. Biometric information including fingerprints and retinal images may also be incorporated into the ID. In civil society, these identifying characteristics are generally recognized as being private information belonging to the individual and are often referred to as personally identifiable information (PII) which can also include, by way of non-limiting example, full legal names, social security numbers, facial features, tattoos, license plates, physical location addresses, speech, and/or text. ID often includes a photograph of the face of the individual that bears the photograph, and that is the primary example of an indicia discussed in this specification.

ID is generally presented at a checkpoint by an individual attempting to exercise a privilege. The nature of a checkpoint is not particularly limited and a person of skill in the art will appreciate the different types of checkpoints. For example, checkpoints are common at border crossings to confirm an individual has the privilege of exiting or entering a geographic area. Checkpoints are also common in airports, to check baggage, check-in for flights, pass through security, board aircraft and clear customs and immigration. The biometric information on the individual's ID may be compared with the features of the individual, and, upon a successful match, the privilege may be granted to the individual. If a match is unsuccessful the privilege may be denied. If the match is successful, but the individual is ineligible for the privilege, then the privilege may also be denied.

Figure 1:
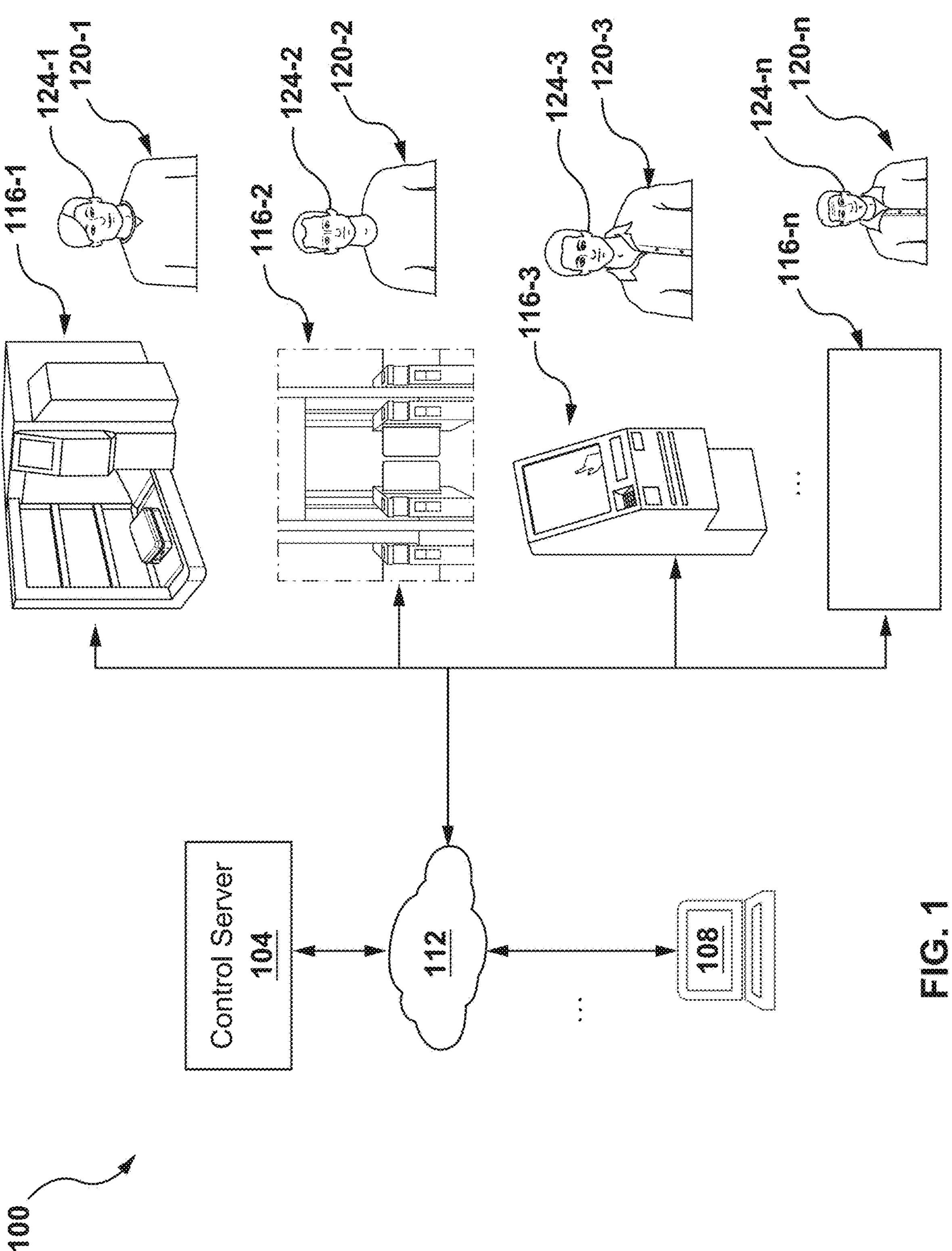
FIG. 1 is a block diagram representing a system for automated control via facial recognition according to one example embodiment.

Referring now to FIG. 1, a system for automated control via facial recognition is indicated generally at 100. System 100 comprises a control server 104 connected to a workstation 108 via a network 112. System 100 also comprises a plurality of checkpoint apparatuses 116-1, 116-2 . . . **116-*n*. (Collectively, the checkpoint apparatuses 116-1, 116-2 . . . 116-*n* will be referred to as apparatuses 116, and generically, as apparatus 116**. This nomenclature is used elsewhere herein.)

Checkpoint apparatuses 116 can be any device where a privilege can be provided to different individuals 120 with unique faces 124 requesting fulfillment of the privilege. Privileges often occur in the context of travel, and can include, for example, the right to check luggage, the right to board an aircraft or other transportation vehicle, the right to "check in" prior to departure of the aircraft, the right to pass through a customs or immigration station. To be clear, checkpoint apparatuses 116 are technological in nature and generally include machinery such as gates, conveyor belts, printers or other output devices. The gates can be used to selectively permit or deny permission to pass from one location to another location within a facility. The gates can be automatically controlled to open or close while under direct or indirect control of control server 104. Likewise, conveyor belts can be used to accept receipt of luggage and to carry the luggage to a loading zone. The printers can be used to generate physical boarding passes or luggage tags.

In the example of system 100 of FIG. 1, checkpoint apparatus 116-1 is a "baggage drop" where an individual may deposit their luggage onto a conveyor belt for transporting the luggage to a loading area of an aircraft or other transportation vehicle. Checkpoint apparatus 116-2 is a gate or turnstile that has a closed position for preventing movement from one physical location to another physical location, and an open position for providing communication between the two physical locations. Checkpoint apparatus 116-3 is a check-in kiosk where an individual may confirm arrival at an airport (or other port) and an intention to board a particular scheduled transportation vehicle. The term "checkpoint" should thus be emphasized as having any particular technical meaning, only to allude to the function being performed by the apparatus 116. Each apparatus 116 is highly electro-mechanical in nature, with input devices such as scanners, cameras and microphones; output devices such as doors, conveyor belts, printers, speakers, and displays; and processors that control the output devices based on input received from each input device using programming logic; and non-volatile storage and volatile storage connected to the processor for fulfilling storage functions. Each apparatus 116 also includes a network interface for connection to network 112. In operation, an individual 120 can present an ID to an input device and have a photograph of their face 124 taken at an apparatus 116. Control server 104 can then compare the photograph with the ID and, depending on the results of the comparison, cause the output device of a respective apparatus 116 to operate according to the relevant privilege.

Figure 2:
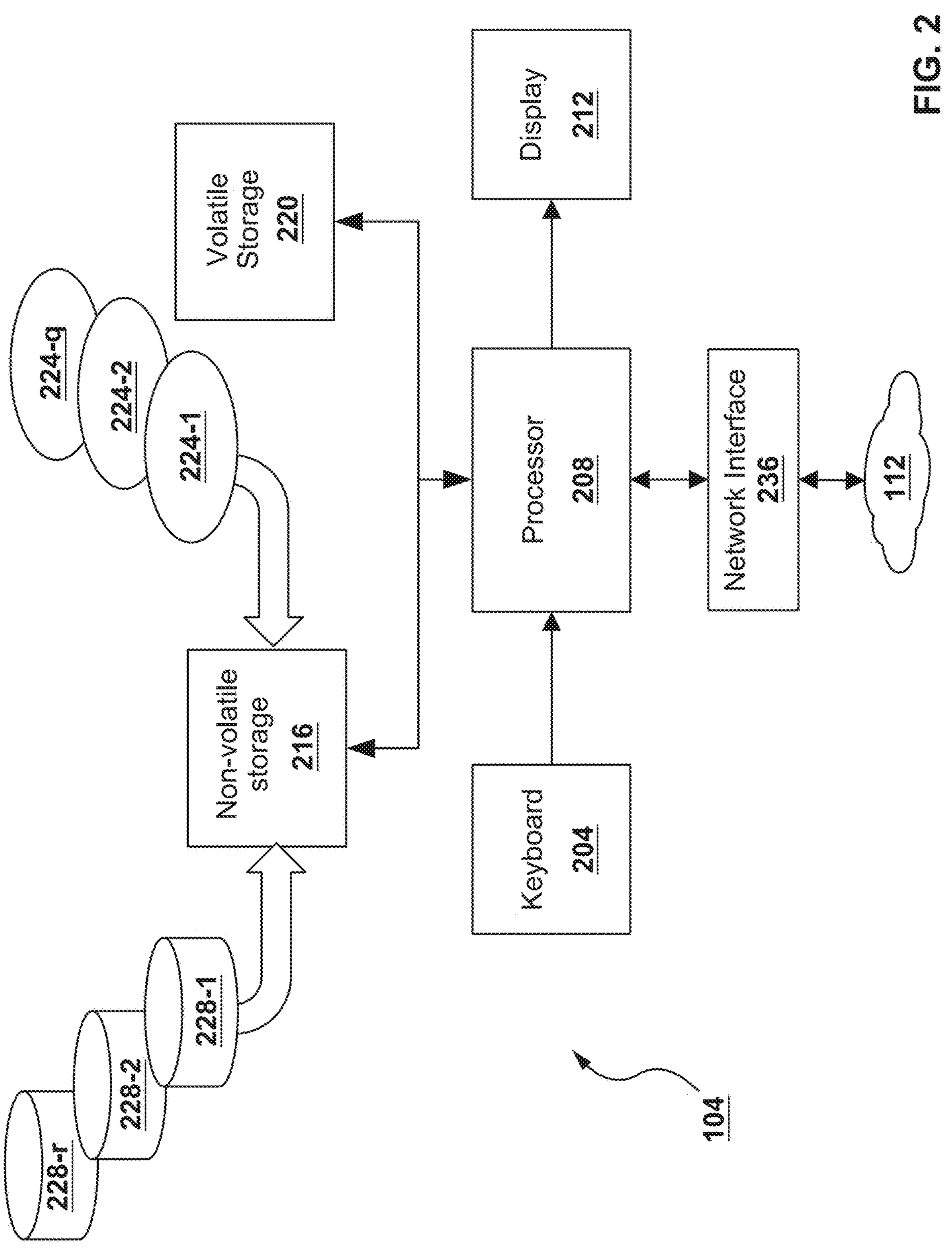
FIG. 2 is a block diagram representing the components of the control server from FIG. 1 in accordance with an example embodiment.

Referring now to FIG. 2, and expanding on certain elements shown in FIG. 1, a non-limiting example of the control server 104 is shown in greater detail in the form of a block diagram. While the control server 104 in FIG. 1 is shown as a single component, the functionality of the control server 104 can be distributed amongst a plurality of components, such as one or more of a plurality of servers and/or cloud computing devices, all of which can be housed within one or more data centers. Indeed, the terms "server" or "engine" itself is not intended to be construed in a limiting sense as to the type of computing hardware or platform that may be used.

The control server 104 may include at least one input device that in a present embodiment includes a keyboard 204. (In variants, other input devices are contemplated.) Input from keyboard 204 is received at a processor 208. In variations, processor 208 can be implemented as a plurality of processors. The processor 208 can be configured to execute different programming instructions that can be responsive to the input received via the one or more input devices. To fulfill its programming functions, the processor 208 is configured to communicate with at least one non-volatile storage unit 216 (e.g., Erasable Electronic Programmable Read Only Memory ("EEPROM"), Flash Memory, Hard-disk) and at least one volatile storage unit 220 (e.g., random access memory (RAM)). Non-volatile storage unit 216 may be implemented as a Read Only Memory (ROM) Programming instructions (e.g. applications 224) that implement the functional teachings of the control server 104 as described herein are typically maintained, persistently, in the non-volatile storage unit 216 and used by the processor 208 that makes appropriate utilization of the volatile storage 220 during the execution of such programming instructions. The non-volatile storage unit 216 typically also includes programming instructions for initializing the components within the control server 104.

The processor 208 in turn is also configured to control a display 212 and any other output devices that may be provided in the control server 104, also in accordance with different programming instructions and responsive to different input received from the input devices.

The processor 208 also connects to a network interface 236, for connecting to the other nodes in system 100. The network interface 236 may thus be generalized as a further input/output device that may be utilized by processor 208 to fulfill various programming instructions. The network interface 236 may include one or more wired and/or wireless input/output (I/O) interfaces that are configurable to communicate with other components of the system 100. For example, the network interface 236 may include one or more wired and/or wireless transceivers for communicating with other components of the system 100. Hence, the one or more transceivers may be adapted for communication with one or more communication links and/or communication networks used to communicate with the other components of the system 100. The network interface 236 may include one or more transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The network interface 236 may also be coupled to a combined modulator/demodulator (MODEM).

Thus, depending on the nature of network 112 and/or the network interface respective to each apparatus 116 or other network interface of the other nodes in the system 100, the network interface 236 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g, 802.11n, etc.), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series standard), a Worldwide Interoperability for Microwave Access (WiMAX) network, for example operating in accordance with an IEEE 802.16 standard, and/or another similar type of wireless network. Hence, the transceivers may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

As will become further apparent below, control server 104 can be implemented with different configurations than described, omitting certain input devices, or including extra input devices, and likewise omitting certain output devices or including extra output devices. For example, the keyboard 204 and the display 212 can be omitted where the control server 104 is implemented in a data center, with such devices being implemented an external terminal or terminal application that connects to the control server 104. As an example, workstation 108 may be used as such an external terminal.

In the present example embodiment, the control server 104 is configured to maintain, within non-volatile storage 216, various applications 224 and files 228. The applications 224 and the files 228 can be pre-stored in non-volatile storage 216 or downloaded via the network interface 236 and saved on the non-volatile storage 216. The processor 208 is configured to execute the applications 224, which accesses files 228, accessing the non-volatile storage 216 and the volatile storage 220 as needed. As noted above, and as will be discussed in greater detail below, the processor 208, when executing applications 224, controls apparatuses 116 under supervisory input via workstation 108.

To further assist in understanding system 100, reference will now be made to FIG. 3 which shows a flowchart indicated generally at 300, depicting a process for generating a machine learning training dataset in accordance with an embodiment of the present specification. Hereafter, the flowchart will be referred to as method 300. Method 300 can be implemented on control server 104 of system 100, but it is to be understood that method 300 can also be implemented on variations of system 100, and likewise, method 300 itself can be modified and operate on system 100. It is to be understood that the blocks in method 300 need not be performed in the exact sequence shown and that some blocks may execute in parallel with other blocks, and method 300 itself may execute in parallel with other processes. Additional processes discussed herein in relation to system 100 are subject to the same non-limiting interpretation.

Figure 3:
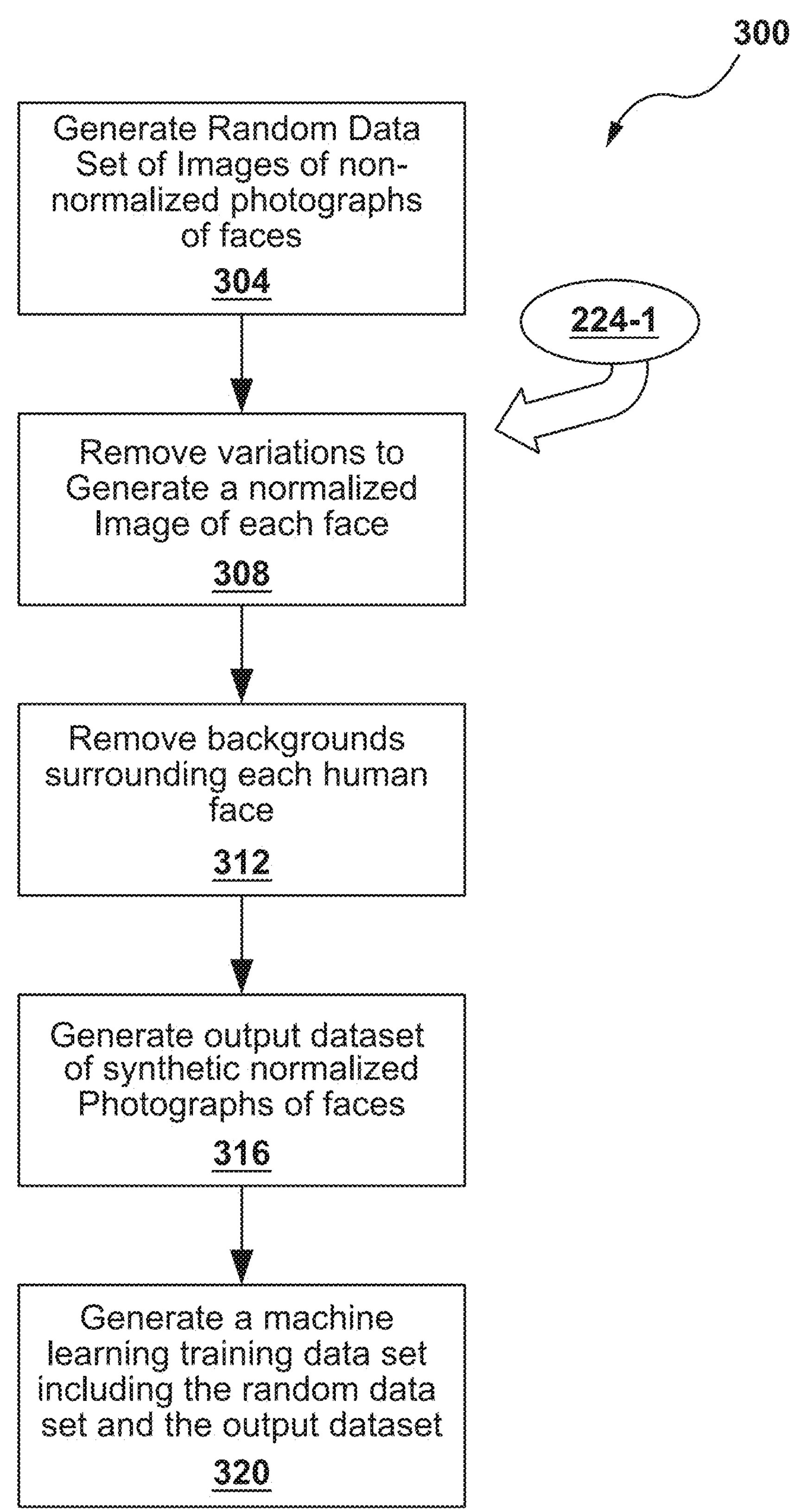
FIG. 3 is a flowchart depicting a method for generating a machine learning training dataset.

Referring to FIG. 3, block 304 comprises generating a random data set of images of non-normalized photographs of faces. Block 304 can be performed using a variety of existing artificial intelligence algorithms such as a pretrained Generative Adversarial Network (GAN) based on random noise. Random input is provided to the algorithm, which results in the generation of a plurality of photographs of face of individuals who do not actually exist. See for example, Tero Karras, Samuli Laine, Timo Aila "A Style-Based Generator Architecture for Generative Adversarial Networks" (https://arxiv.org/abs/1812.04948), the contents of which are incorporated herein by reference.

Block 308 comprises removing variations from each of the images generated at block 404, in order to generate a normalized version of each face. Block 308 can be performed using a variety of existing techniques including the techniques disclosed in co-pending application entitled "Generating Training and/or Testing Data of a Face Recognition System for Improved Reliability", bearing application number 22305318.2 and having a filing date of Mar. 18 2022 the contents of which are incorporated herein by reference. See also Yibo Hu, Xiang Wul, Bing Yu, Ran He, Zhenan Sun, "Pose-Guided Photorealistic Face Rotation" ("Yibo") (https://openaccess.thecvf.com/content_cvpr_2018/papers/Hu_Pose-Guided_Photorealistic_Face_CVPR_2018_paper.pdf), the contents of which are incorporated herein by reference. Note that while Yibo does create a basic normalized, front-facing image, it is not a presently preferred implementation for block 308 because Yibo only normalizes pose, but does not normalize expression or illumination or other factorts that are expected from passport-like type images according to the presently preferred embodiments herein.

A normalized version according to block 308 rotates any offset in the rotation of the face so that the face appears to be directly looking into the camera as expected in an ID photograph. However, background artifacts may remain.

Figure 4:
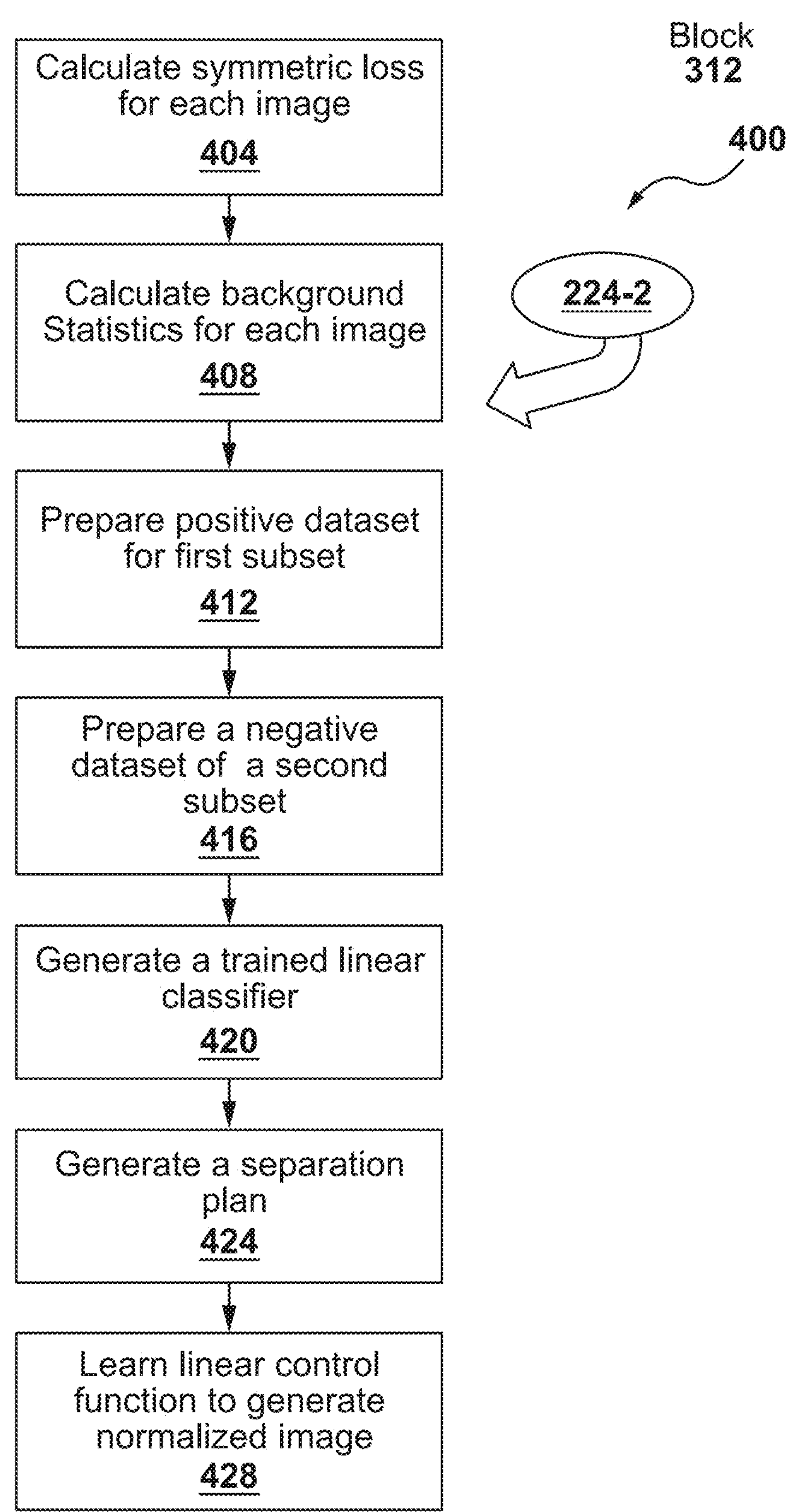
FIG. 4 is a flowchart depicting a method for removing background artifacts according to FIG. 3.

Block 312 comprises removing background artifacts that surround each human face in the photographs from the dataset of Block 308. Background artifacts include imagery, colour and the like that surround the face. Illumination of the photograph can also be changed since when the background artifacts are removed, the illumination of the rest of the photograph can also be affected and thus overall photo illumination is also typically changed at this block Bock 312 can be performed according to method 400 in FIG. 4. Block 404 comprises calculating a symmetric loss for each image. Block 408 comprises calculating background statistics for each image.

Block 412 comprises preparing a positive dataset of a first subset of the images with: a symmetric loss in a first lower range; a background color in a first higher range; and a background diversity in a second lower range.

Block 416 comprises preparing a negative dataset of a second subset of the images with:

a. the symmetric loss in a higher range greater than the first lower range;

b. the background color in a third lower range than the second higher range; and c. the background diversity in a third range higher than the second lower range;

Block 420 comprises generating a trained linear classifier separating the positive dataset and the negative dataset for each image.

Figure 5:
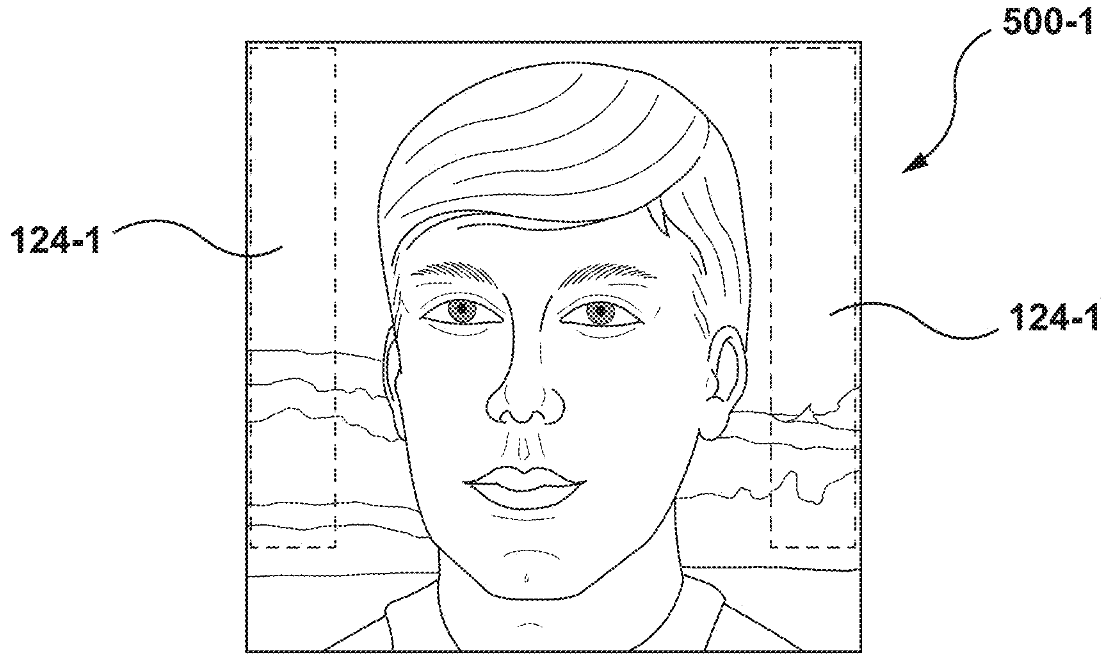
FIG. 5 shows an example of generation of a sample from the negative dataset and a sample from the positive dataset discussed in relation to FIG. 4.
Figure 5:
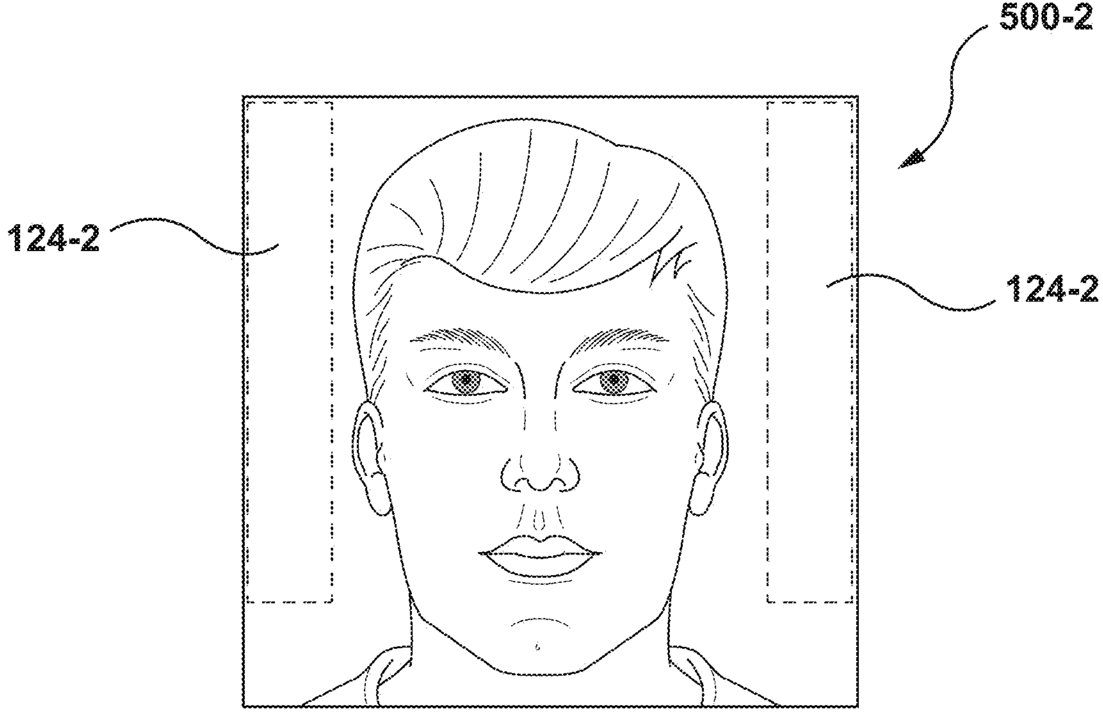

FIG. 5 represents example performance of block 412 and block 416 showing a sample from the positive dataset 500-1 and a sample from the negative dataset 500-2.

Block 424 comprises generating a separation plan from the trained linear classifier; and Block 428 comprises learning a linear control function to generate each normalized image that removes the backgrounds, based on the foregoing.

The linear control function for block 428 for the new image can be based on the following equation:

$$W_i' = W_i + (\beta_1 \times LS_i + \beta_2 \times MB_i + \beta_3 \times SB_i + \beta_4) \times P$$

where:

$W_i$ is a code for each original image from the removing variations step $W_i'$ is a code for each new image corresponding to the original image P is the normal vector of the separation hyperplane where background statistics are determined according to:

$$L_i = I[0{:}h,\ 0{:}w]$$

$$R_i = I[0{:}h,\ n-w{:}n]$$

h=height of the image in pixels w=width of the image in pixels

I=image of the size n×n

Flip(I) is the horizontal flip of image I where symmetric loss is calculated according to:

$$LS_i = \frac{\sum_{k=1}^{n} \sum_{j=1}^{n} |I(k,j) - \text{Flip}(I)(k,j)|}{n^2}$$

where:

$$MB_i = \frac{\Sigma L_i + \Sigma R_i}{2 \times w \times h}$$

$$SB_i \frac{std(L_i) + std(R_i)}{2}$$

and, where:

Li indicates a left window surrounding the facial image

Ri indicates a right window surrounding the facial image

MBi indicates the background color

SBi indicates the background diversity

Returning again to method 300, block 316 comprises generating an output data set of synthetic normalized photographs of faces, and block 320 comprises generating a machine learning training dataset that includes the random dataset from block 304 and the normalized dataset from block 316.

As noted, block 312 can be performed according to method 400. Thus, background 124-1 (i.e. background imagery and other artifacts) includes a left window and a right window, per Li and Ri from the above equations.

Figure 6:
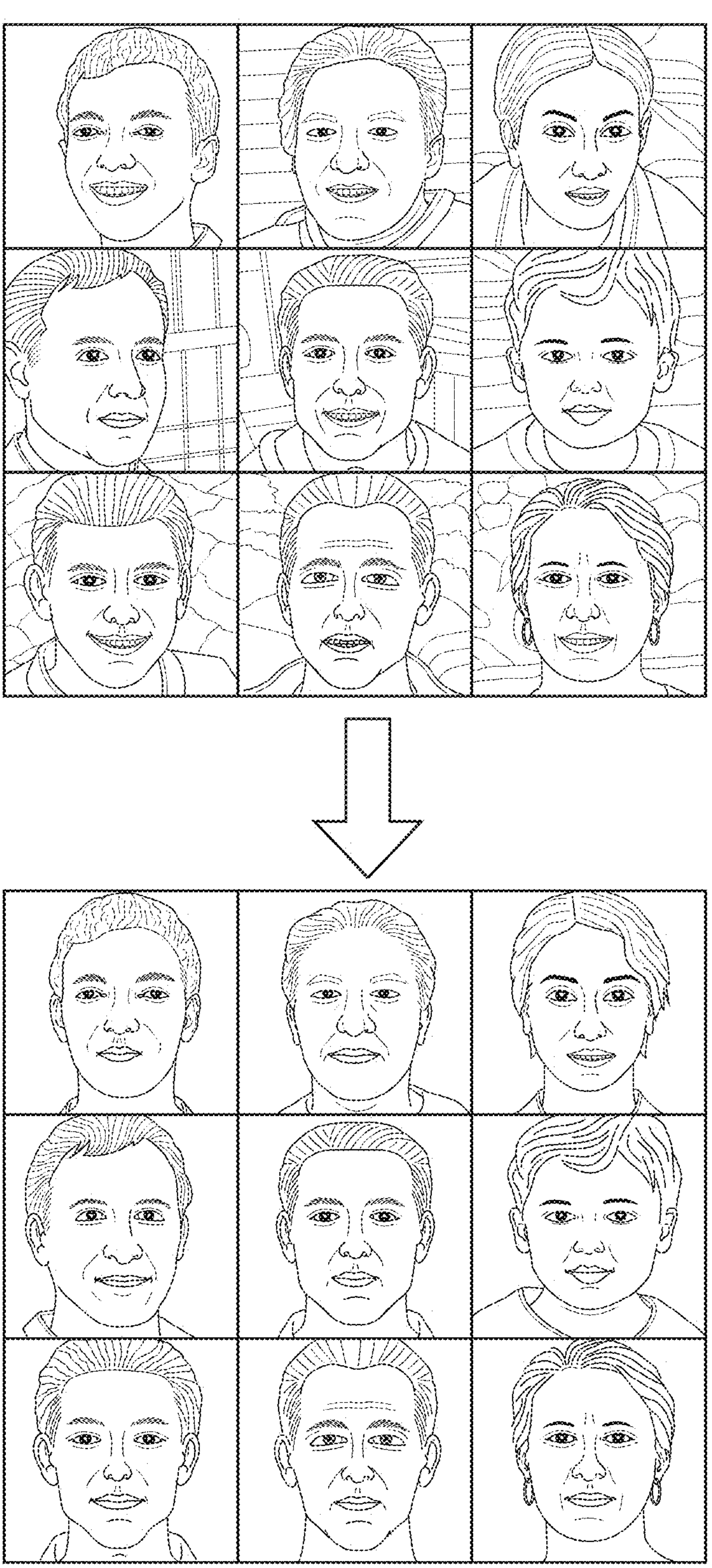
FIG. 6 shows an example of generation of a plurality of normalized facial photographs from a plurality of non-normalized photographs.

FIG. 6 shows a plurality of images processed according to block 308 and block 312, whereby facial images are normalized, and background artifacts are removed. To elaborate, non-normalized photographs are processed to produce a normalized photograph so that the facial orientation is directly facing, the facial expression is neutralized and the background is removed.

The method can further comprise balancing the demographic distribution of faces in the output dataset prior to the training. The balancing is performed using an Interface generative adversarial network (InterfaceGAN) or selecting a balance of the demographics (gender, age, skin colour, etc) from the generated data. (A person skilled in the art will recognize that an InterfaceGAN is not a traditional a GAN, rather it is a framework to open a GAN and modify the latent code in a manner to change certain attributes once generated). InterfaceGAN is short for Interpreting-Face-GANs.

Figure 7:
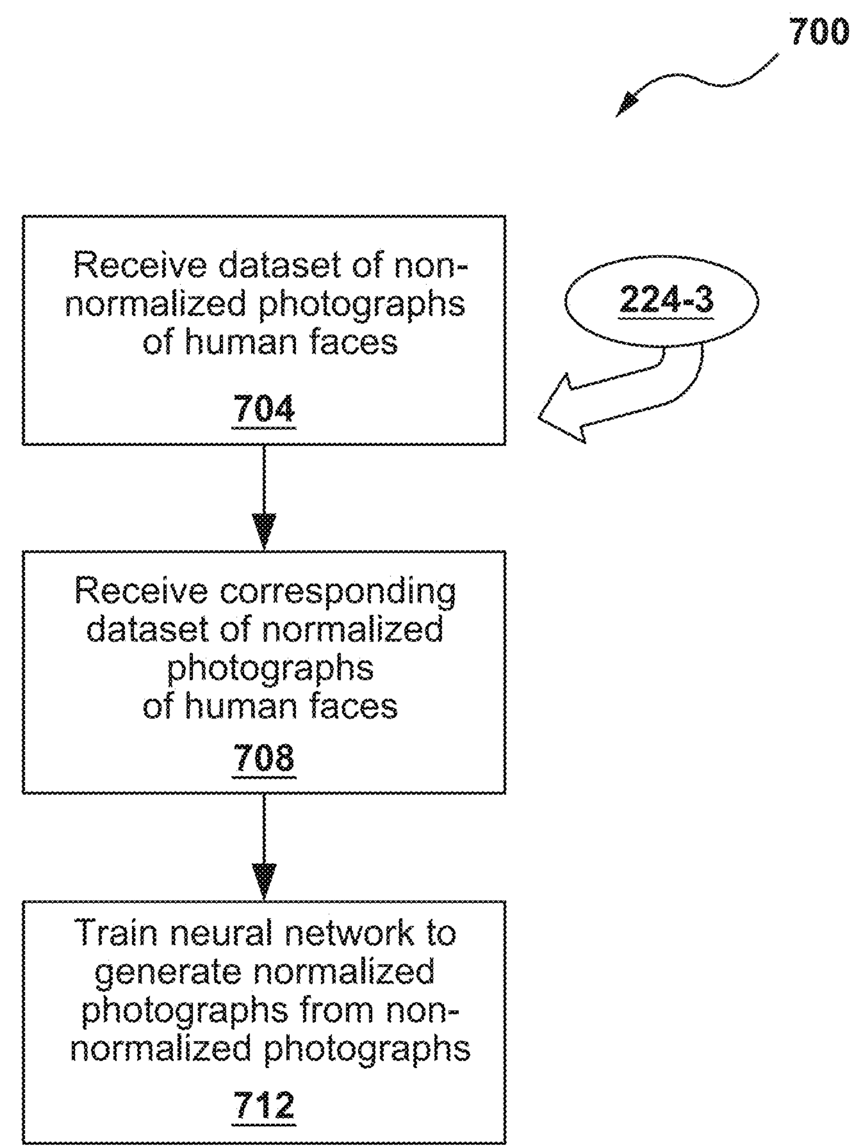
FIG. 7 is a flowchart depicting a process for training a neural network to generate normalized facial photographs from non-normalized photographs.

Referring now to FIG. 7, a method for training a neural network to generate normalized photographs of faces from non-normalized faces is indicated generally at 700. Method 700 can be performed by control server 104. Method 700 can be based on actual images of human faces or based on the dataset from block 320. Block 704 comprises receiving a dataset of non-normalized photographs of human faces. The dataset can originate from an actual dataset of actual photographs of human faces that are taken from an offset or angle, but are not-normalized, and include backgrounds. Or, the dataset for block 704 can be the same dataset as generated at block 304.

Block 708 comprises receiving a corresponding dataset of normalized photographs of human faces. The dataset for block 708 can originate from an actual dataset of human faces based on passport photos or other photographs of the same persons from block 704 but where the photographs are normalized and have no backgrounds. The dataset for block 708 can originate from the normalized photographs from block 316.

Block 712 comprises training a neural network to generate normalized photographs from non-normalized photographs based on the dataset from block 704 and block 708.

Figure 8:
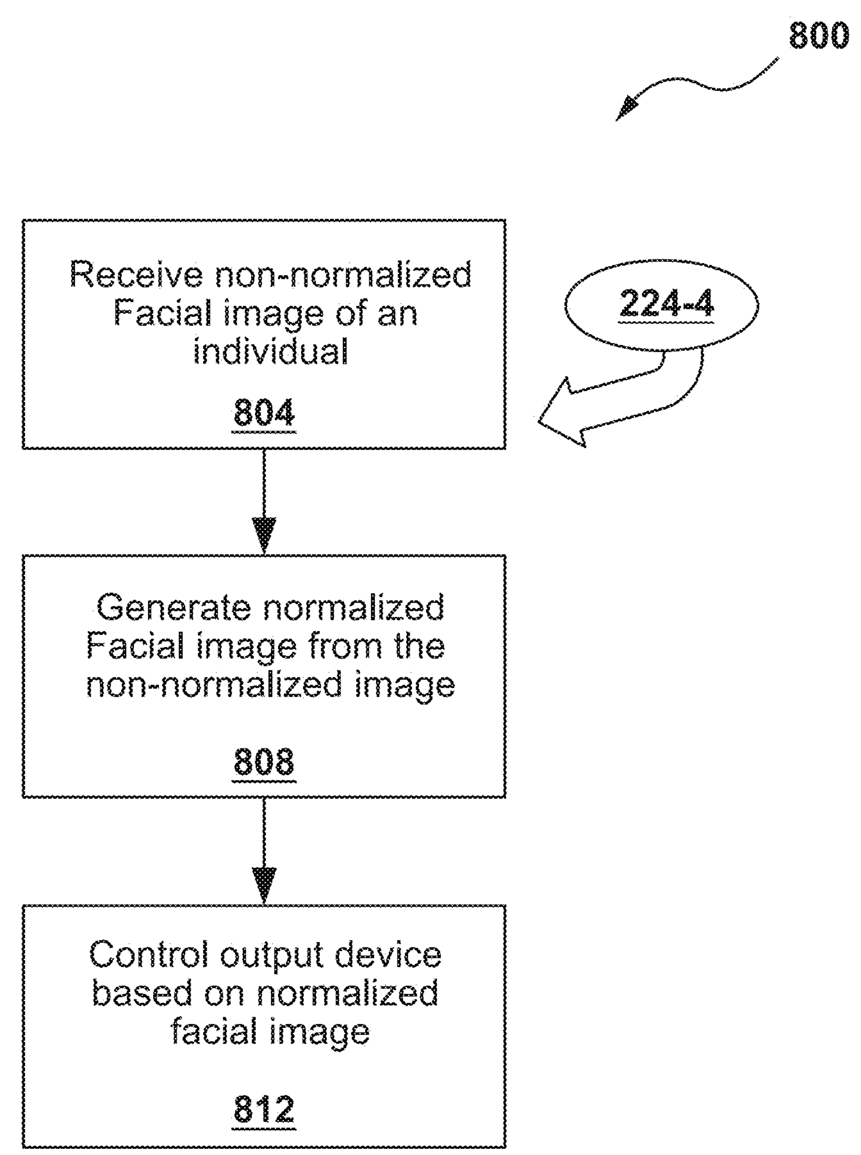
FIG. 8 is a flowchart depicting a process for controlling an output device based on a normalized facial photograph that is generated from a non-normalized photograph; and, FIG. 9 shows a process for controlling an output device based on a comparison of a passport photograph with a normalized photograph generated from a non-normalized photograph.

Referring now to FIG. 8, a method for controlling an output device is indicated generally at 800. Method 800 can be performed by control server 104, and the output device can be a checkpoint apparatus 116. Block 804 comprises receiving a non-normalized facial image of an individual. According to the example of system 100, assume that individual 120-2 is at gate checkpoint apparatus 116-2. Further assume that individual 120-2 has a photograph of their face 124-2 taken by a camera on gate checkpoint apparatus 116-2.

Figure 9:
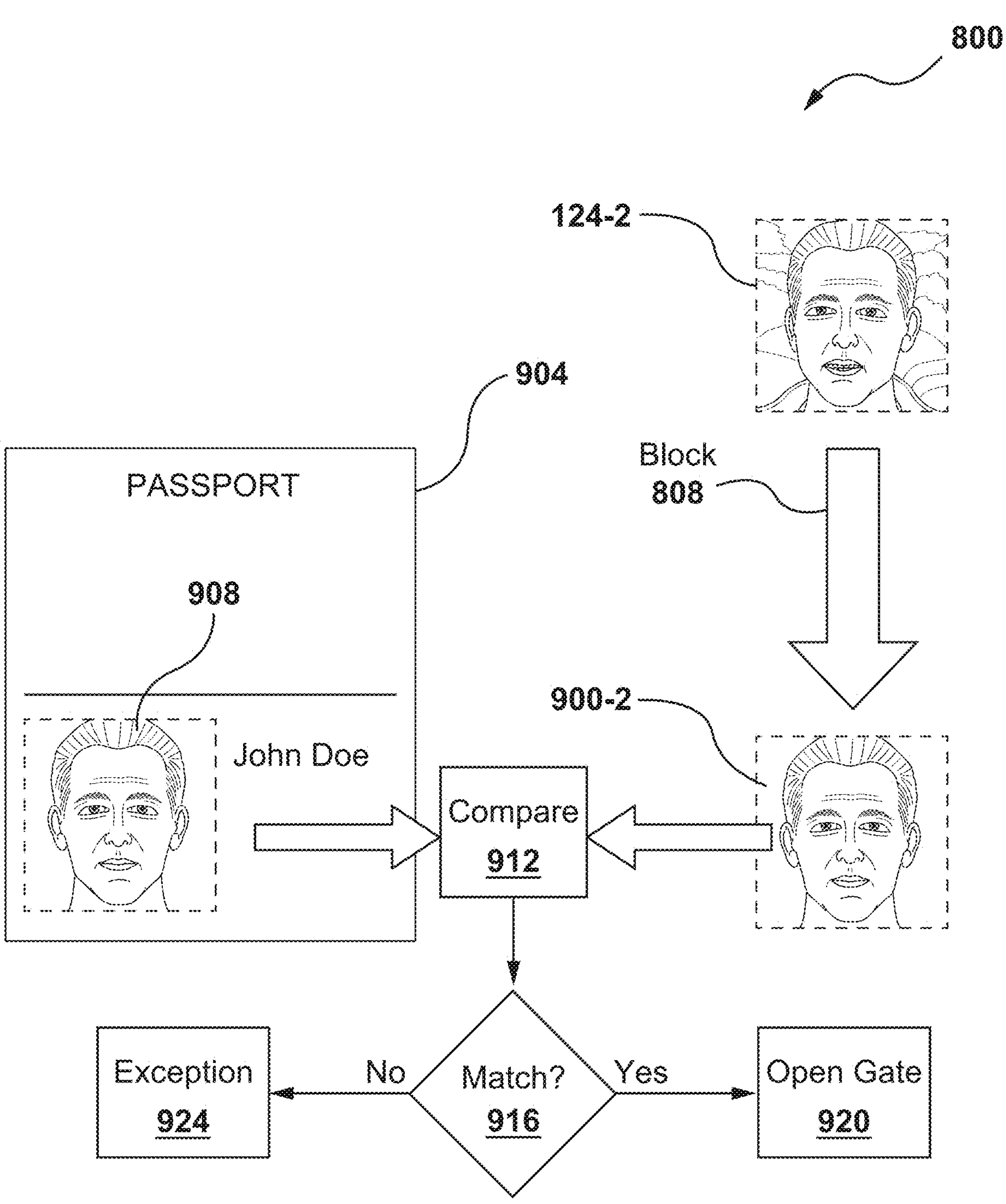

Block 808 comprises generating a normalized facial image from the non-normalized image received at block 804. Block 808 can be performed using the neural network trained using method 700. Notably, any background artifacts are removed and the face is oriented directly forwards, resulting in a passport-like photograph. Example performance of block 808 is in FIG. 9, Block 812 comprises controlling an output device based on the normalized image from block 808. Referring to FIG. 9, according to system 100, block 812 can also assume that individual 124-2 has scanned their passport 904 or other ID at a camera mounted on checkpoint apparatus 116-2, thereby capturing an image of the passport photograph 908 of the face 124-2 of the individual 120-2. In this fashion the passport photograph 908 can be readily compared (see block 912, performed by control server 104) to the passport-like photograph 900-2 from block 808.

A "match" at block 916 can thus result in control server 104 issuing a command to gate checkpoint apparatus 116-2 to open (block 920), thereby allowing individual 120-2 to pass through the gate. A failure to "match" at block 916 can lead to an exception (block 924) control, such as leaving the gate shut and activating an alarm or signal inviting human intervention. In a variant, the two images are presented on a screen to an individual who manually makes the determination, i.e., the "match", as to how to operate the output device. Such a manual determination can in and of itself be used to train another neural network for future automated control of the output device.

Variations are contemplated. For example, the present specification can be modified for photo-editing, as an actual photograph of a real individual can be inverted into the GAN space to provide non-random input at block 304. As a result, any photograph of any individual can be normalized to remove background and orient the face of the individual forwards, simulating staring into a camera directly. In this variant, passport photos can be generated from any photograph. So, in a variant of system 100, the teachings herein can be provided for other devices other than checkpoint apparatuses 116, such as a passport photobooth whereby a photograph is taken of the face 124 of an individual and automatically converted into a format suitable for a passport or other identification document.

It is to be understood that in other variations, each of the methods herein can stand-alone as separate embodiments. For example, method 400 can stand alone as a method for removing backgrounds from photographs, whether those photographs are synthetic or real.

Various advantages are offered by the present specification. For example, controlling checkpoints in airports has significant inherent efficiency advantages in increasing throughput through the airport with greater accuracy. A specific challenge in the airport, environment, however, is generating a training dataset that does not violate privacy and involve improper use of personal identifiable information (PII). Thus, while method 700 can be achieved with a set of data based on accumulating non-normalized photographs of actual individuals 120 passing through airports, the misuse of PII makes this practically difficult. Thus, the use of method 300 and method 400 permit the generation of a useful training dataset for use in method 800 without misuse of PII, and/or much more quickly than labourously collecting a training set of actual data.

As will now be apparent from this detailed description, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot control a display screen, cannot implement a machine learning algorithm, nor implement a machine learning algorithm feedback loop, and the like).

In the foregoing specification, specific embodiments have been described. However, one of ordinary skill in the art will now appreciate that various modifications and changes can be made without departing from the scope of the disclosure as set forth in the claims below. Accordingly, the specification and figures are to be regarded in illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The scope is defined solely by the appended claims including any amendments made during the pendency of this application and all equivalents of those claims as issued.

As another variant, control server 104 need not be remote from each checkpoint apparatus 116 and control server 104 can be incorporated into each checkpoint apparatus 116.

Further variants comprise a method for normalizing a non-normalized photograph. The method can be used, for example, for a photo editing tool or mobile app, in a photo booth, or the like. The method comprises receiving a non-normalized image representing a synthetic photograph of a human face and associated background, generating a normalized photographs for the synthetic photograph by removing variations to generate a normalized image of the human face, and removing the background surrounding the human face. The method finally comprises generating an output image comprising the normalized photograph. In embodiments, the method further comprises capturing an actual photograph of a face of an individual, inverting the photograph into the GAN space to create the synthetic photograph in order to provide a normalized version of the actual photograph.

In further embodiments, removing the backgrounds comprises calculating a symmetric loss for each image, calculating background statistics for each image, and preparing a positive dataset of a first subset of the images with a symmetric loss in a first lower range, a background color in a first higher range, and a background diversity in a second lower range. In these embodiments, removing the backgrounds further comprises preparing a negative dataset of a second subset of the images with the symmetric loss in a higher range greater than the first lower range, the background color in a third lower range than the second higher range, and the background diversity in a third range higher than the second lower range. In these embodiments, the removing the backgrounds further comprises generating a trained linear classifier separating the positive dataset and the negative dataset for each image, generating a separation plan from the trained linear classifier, and learning a linear control function to generate each normalized image based on the foregoing.

In further embodiments, the linear control function for the new image for the training set is based on the following equation:

$$W_i' = W_i + (\beta_1 \times LS_i + \beta_2 \times MB_i + \beta_3 \times SB_i + \beta_4) \times P$$

where:

$W_i$ is a code for each original image from the removing variations step $W_i'$ is a code for each new image corresponding to the original image P is the normal vector of the separation hyperplane where background statistics are determined according to:

$$L_i = I[0{:}h,\ 0{:}w]$$

$$R_i = I[0{:}h,\ n-w{:}n]$$

h=height of the image in pixels, w=width of the image in pixels,

I=image of the size n×n,

Flip(I) is the horizontal flip of image I, where symmetric loss is calculated according to:

$$LS_i = \frac{\sum_{k=1}^{n}\sum_{j=1}^{n}|I(k,\ j) - \text{Flip}(I)(k,\ j)|}{n^2}$$

where:

$$MB_i = \frac{\Sigma L_i + \Sigma R_i}{2 \times w \times h}$$

$$SB_i \frac{std(L_i) + std(R_i)}{2}$$

and, where:

Li indicates a left window surrounding the facial image,

Ri indicates a right window surrounding the facial image,

MBi indicates the background color,

SBi indicates the background diversity.

In further variants, the neural network dataset, from which the normalized image is created can be based on synthetic images. Moreover, the dataset can be based on synthetic images where the variations are removed to generate a normalized dataset and the backgrounds from the images are removed. In yet further variants, the image of the individual and the image of a facial photograph on an identification document may be generated on a screen for an individual who determines if the first image and the second image of the same individual.

The one or more machine-learning algorithms and/or deep learning algorithms and/or neural networks discussed herein may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like. To be clear, any suitable machine-learning algorithm and/or deep learning algorithm and/or neural network is within the scope of present specification.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the process and/or system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the different approaches could be used.

Moreover, embodiments can be implemented as a computer-readable storage medium having computer readable code stored thereon for programming a computer (e.g., comprising a processor) to perform a process as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The invention claimed is:

1. A method for controlling an output device based on a normalized image of a face generated from a captured non-normalized image of the face comprising:

generating a random dataset of images representing synthetic non-normalized photographs of human faces and backgrounds;

generating an output dataset of synthetic normalized photographs by:

for each synthetic non-normalized photograph:

removing variations to generate a normalized image of each human face; and removing the backgrounds surrounding each human face for each normalized image, removing the backgrounds comprising:

calculating a symmetric loss for each image;

calculating background statistics for each image;

preparing a positive dataset of a first subset of the images with:

a symmetric loss in a first lower range;

a background color in a first higher range; and a background diversity in a second lower range;

preparing a negative dataset of a second subset of the images with:

the symmetric loss in a higher range greater than the first lower range;

the background color in a third lower range than the second higher range; and the background diversity in a third range higher than the second lower range;

generating a trained linear classifier separating the positive dataset and the negative dataset for each image;

generating a separation plan from the trained linear classifier; and learning a linear control function to generate each normalized image based on the foregoing;

generating a training dataset including the random dataset and the output dataset;

training a neural network to generate normalized photographs from non-normalized photographs using the training dataset;

receiving a non-normalized facial image of an individual;

applying the neural network to generate a normalized facial image from the non-normalized facial image; and controlling an output device based on the normalized image of the individual.

2. The method of claim 1, further comprising:

capturing a passport image of the individual;

performing a comparison of the normalized image with the passport image; and, wherein the controlling comprises selectively controlling a gate to permit or deny passage of the individual through the gate according to the comparison.

3. The method of claim 2, wherein the synthetic non-normalized photographs are generated from random noise and a pre-trained generative adversarial network (GAN) to thereby control the output device using a neural network without relying upon personal identifiable information (PII) in a training dataset.

4. The method of claim 1, wherein the controlling comprises controlling a display device to generate the normalized facial image beside the non-normalized facial image of the individual.

5. The method of claim 1, wherein removing variations includes at least one of normalizing frontal facial illumination; generating a neutral pose, generating a neutral expression, removal of glasses, and creating a uniform light color background.

6. The method of claim 1, wherein the random dataset is generated according to a generative adversarial network (GAN) and the applying comprises inverting the non-normalized facial image into the GAN space used for the random dataset.

7. The method of claim 1, wherein the linear control function for the new image for the training set is based on the following equation:

$$W_i' = W_i + (\beta_1 \times LS_i + \beta_2 \times MB_i + \beta_3 \times SB_i + \beta_4) \times P,$$

wherein $W_i$ is a code for each original image from the removing variations step, $W'_i$ is is a code for each new image corresponding to the original image, and P is the normal vector of the separation hyperplane;

wherein background statistics are determined according to:

$$L_i = I[0{:}h,\ 0{:}w]$$

$$R_i = I[0{:}h,\ n-w{:}n];$$

wherein h is a height of the image in pixels;

w is a width of the image in pixels;

l is an image of the size n×n;

wherein Flip (I) is the horizontal flip of image I;

wherein symmetric loss is calculated according to:

$$LS_i = \frac{\sum_{k=1}^{n}\sum_{j=1}^{n}|I(k,\ j) - \text{Flip}(I)(k,\ j)|}{n^2};$$

and wherein $$MB_i = \frac{\Sigma L_i + \Sigma R_i}{2 \times w \times h}$$

$$SB_i \frac{std(L_i) + std(R_i)}{2};$$

wherein

Li indicates a left window surrounding the facial image;

Ri indicates a right window surrounding the facial image;

MBi indicates the background color; and

SBi indicates the background diversity.

8. The method of claim 1, further comprising balancing the demographic distribution of faces in the output dataset prior to the training.

9. The method of claim 8, wherein the balancing is performed using an Interface (Interpreting Face) generative adversarial networks (InterfaceGAN).

10. A computer program product comprising program code instructions stored on at least one non-transitory computer readable medium to execute the method steps according to claim 1, when said program code instructions are executed on a computer.

* * * * *